(12) United States Patent
Isaji et al.

(10) Patent No.: US 7,209,833 B2
(45) Date of Patent: Apr. 24, 2007

(54) COLLISION POSSIBILITY DETERMINATION DEVICE

(75) Inventors: Kazuyoshi Isaji, Kariya (JP); Naohiko Tsuru, Handa (JP)

(73) Assignee: DENSO Corporation, Kariya (JP)

( * ) Notice: Subject to any disclaimer, the term of this patent is extended or adjusted under 35 U.S.C. 154(b) by 138 days.

(21) Appl. No.: 11/037,429

(22) Filed: Jan. 17, 2005

(65) Prior Publication Data

US 2005/0159893 A1    Jul. 21, 2005

(30) Foreign Application Priority Data

Jan. 19, 2004    (JP)    .............................. 2004-010956

(51) Int. Cl.
*G08G 1/16*    (2006.01)
*B60R 21/01*    (2006.01)

(52) U.S. Cl. ...................................... 701/301; 340/436
(58) Field of Classification Search ...................... None
See application file for complete search history.

(56) References Cited

U.S. PATENT DOCUMENTS

| | | | |
|---|---|---|---|
| 5,475,494 A | 12/1995 | Nishida et al. | |
| 5,979,586 A * | 11/1999 | Farmer et al. | 180/274 |
| 6,327,536 B1 | 12/2001 | Tsuji et al. | |
| 6,496,117 B2 * | 12/2002 | Gutta et al. | 340/576 |
| 6,789,015 B2 * | 9/2004 | Tsuji et al. | 701/301 |
| 7,065,230 B2 * | 6/2006 | Yuasa et al. | 382/104 |
| 2001/0008992 A1 | 7/2001 | Saito et al. | |
| 2003/0060980 A1 | 3/2003 | Prakah-Asante et al. | |

FOREIGN PATENT DOCUMENTS

JP    11-139229    5/1999

* cited by examiner

*Primary Examiner*—Michael J. Zanelli
(74) *Attorney, Agent, or Firm*—Harness, Dickey & Pierce, PLC

(57) ABSTRACT

A computer of a collision possibility determination device has a pixel position setting section, a travel vector calculating section, a vector direction determining section, and a collision possibility determining section. The pixel position setting section sets a travel direction pixel position in an image of view ahead of a vehicle and a circle with a specific radius from the set travel direction pixel position. The travel vector calculating section calculates a travel vector of an object that exists in the travel direction of the vehicle. The vector direction determining section determines whether an orientation of the travel vector matches a direction toward the inside of the circle. The collision possibility determining section determines a possible collision between the vehicle and the object when the orientation of the travel vector matches the direction toward the inside of the circle.

10 Claims, 4 Drawing Sheets

COLLISION POSSIBILITY DETERMINATION DEVICE

CROSS REFERENCE TO RELATED APPLICATION

This application is based on and incorporates herein by reference Japanese Patent Application No. 2004-10956 filed on Jan. 19, 2004.

FIELD OF THE INVENTION

The present invention relates to a collision possibility determination device.

BACKGROUND OF THE INVENTION

A warning device that produces a warning about an object is proposed in JP-A-11-139229. If an object that is not recognized by a driver of a vehicle exists, the warning device determines a warning level based on a distance and a bearing between the object and the vehicle. Then, the warning device produces the determined level of warning.

The warning device determines whether an object is located in a vision of the driver to determine whether the driver has recognized the object. However, the driver may not have recognized the object if the driver does not carefully look at the object. Thus, the warning device could erroneously determine the recognition of the object by the driver. Namely, it cannot properly determine whether the object is an obstacle to the vehicle.

SUMMARY OF THE INVENTION

The present invention therefore has an objective to provide a collision possibility determination device that properly detects an object that is possibly an obstacle to a vehicle. A collision possibility determination device of the present invention includes image capturing means, object detecting means, main pixel position specifying means, pixel position setting means, storage means, travel vector calculating means, and collision possibility determining means.

The image capturing means captures an image of view ahead of the vehicle. The object detecting means determines whether an object exists in the travel direction of the vehicle from the image captured by the image capturing means. The main pixel specifying means specifies a main pixel of an image of the object, which represents a position of the object in the image of view. The pixel position setting means sets a travel direction pixel position in the image of view based on the travel direction of the vehicle. The storage means stores the main pixel position.

The travel vector calculating means calculates a travel vector of the object from a history of the main pixel position of the object stored by the storage means. The travel vector indicates a direction of relative movement of the object with respect to the vehicle. The collision possibility determining means determines a possibility of a collision between the vehicle and the object based on an orientation of the travel vector and the travel direction pixel position.

An obstacle to the vehicle is an object that exists in the travel direction of the vehicle. Therefore, such an object can be detected based on the travel direction of the vehicle and the direction of relative movement of the object. Namely, a possibility of collision can be determined based on the orientation of the travel vector and the travel direction pixel position, which is set based on the travel direction of the vehicle. With this configuration, the collision possibility determination device can properly determine an obstacle to the vehicle.

BRIEF DESCRIPTION OF THE DRAWINGS

The above and other objectives, features and advantages of the present invention will become more apparent from the following detailed description made with reference to the accompanying drawings. In the drawings.

DETAILED DESCRIPTION OF THE PREFERRED EMBODIMENT

Figure 1:
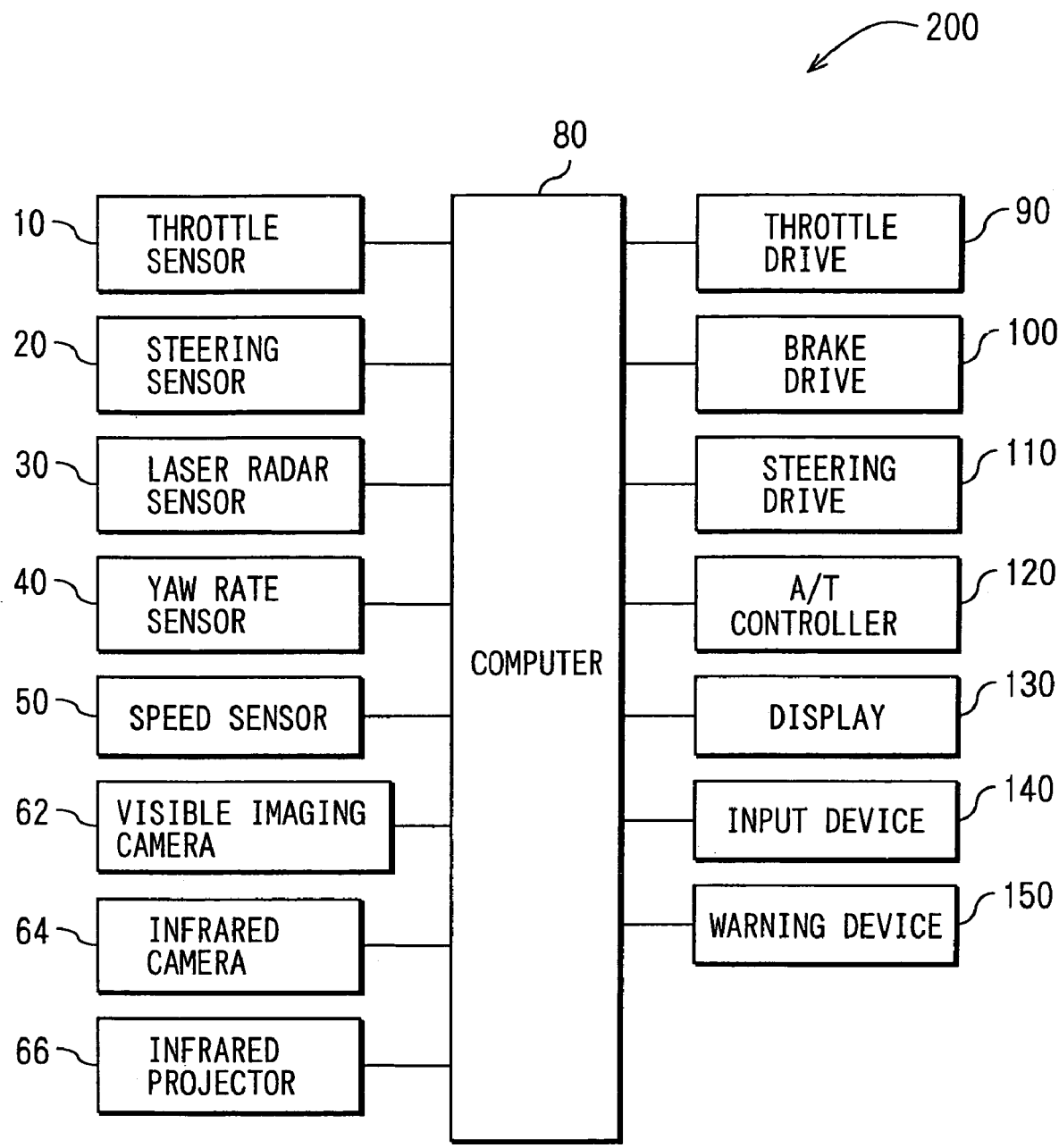
FIG. 1 is a block diagram of an active safety system according to an embodiment of the present invention.

The preferred embodiment of the present invention will be explained with reference to the accompanying drawings. In the drawings, the same numerals are used for the same components and devices.

In an active safety system 200 shown in FIG. 1, a throttle sensor 10, a steering sensor 20, a laser radar sensor 30, a yaw rate sensor 40, a vehicle speed sensor 50, a visible imaging camera 62, an infrared camera 64, and an infrared projector 66 are connected to a computer 80. A throttle drive 90, a brake drive 100, a steering drive 110, automatic transmission (A/T) controller, a display 130, an input device 140, and a warning device 150 are also connected to the computer 80.

The computer 80 includes an input and output interface (I/O) and various drive circuits although they are not shown in figures. The I/O and the drive circuits have regular hardware configurations and therefore their configurations will not discussed. The computer 80 determines a possibility of collision between the vehicle and an object that exists ahead of the vehicle. If a possible collision is determined, the computer 80 performs a process for producing a warning to the driver through the display 130 or the warning device 150.

The computer 80 also performs driving control through controls of the throttle drive 90, the brake drive 100, the steering drive 110, and the A/T controller 120 based on sensor outputs. The driving control includes lane keeping control for supporting the driver in driving within a lane, and safe distance keeping control for keeping a certain distance between the vehicle and a vehicle in front.

The throttle sensor 10 detects the amount of the movement of an accelerator operated by a driver. An operation signal indicating the amount of the accelerator movement detected by the throttle sensor 10 is transmitted to the computer 80. The steering sensor 20 detects a variation in steering angle. A relative steering angle is determined based on the variation in steering angle detected by the steering sensor 20.

The laser radar sensor 30 applies laser light to a predetermined area ahead of the vehicle. It detects a distance, a relative speed, and a bearing between the vehicle and an object, such as a vehicle in front, that reflects the laser light. Object information obtained from the detection is converted in to an electrical signal and inputted to the computer 80. The object detection can be performed by using electrical waves, including millimeter waves and microwaves, or ultrasonic waves.

The yaw rate sensor 40 detects an angular speed of the vehicle with respect to a vertical axis of the vehicle. The vehicle speed sensor 50 detects signals indicating rotation speeds of wheels of the vehicle.

The visible imaging camera 62 is an optical camera mounted to the vehicle in a position to capture an image of view ahead of the vehicle. The visible imaging camera 62 is configured so that it can adjust shutter speeds, frame rates, output gains of digital signals outputted to the computer 80 based on instructions from the computer 80. The visible imaging camera 62 outputs a digital signal corresponding to a pixel value that indicates a level of brightness for a pixel of the image and a synchronizing signal between horizontal and vertical images to the computer 80.

The infrared camera 64 captures an image of the driver's face to which infrared light is emitted from the infrared projector 66. Driver's gaze direction is detected from the image of the driver's face.

The throttle drive 90, the brake drive 100, the steering drive 110, and the A/T controller 120 are operated according to instructions issued by the computer 80. The throttle drive 90 controls outputs of an internal combustion engine by adjusting an opening of a throttle valve. The brake driver 100 adjusts brake pressures. The steering drive 110 drives steering by producing torque in the steering. The A/T controller 120 selects an appropriate gear position for controlling the speed of the vehicle from gear positions in an automatic transmission.

The display 130 is a liquid crystal display and arranged around a center console inside the passenger compartment of the vehicle. The display 130 receives image data containing information about a warning for calling the driver's attention and displays an image based on the received image data.

The input device 140 is a touch switch integrated with the display 130 or a mechanical switch. A user can input various inputs including character inputs through the input device 140. The warning device 150 produces an audible alarm for calling the driver's attention according to an instruction from the computer 80. For example, it produces an audible alarm when the vehicle is departing from a driving lane under the lane keeping control. Under the safe distance keeping control, it produces an audible alarm when the vehicle rapidly approaches a vehicle in front and becomes out of the safe distance keeping control.

Figure 2:
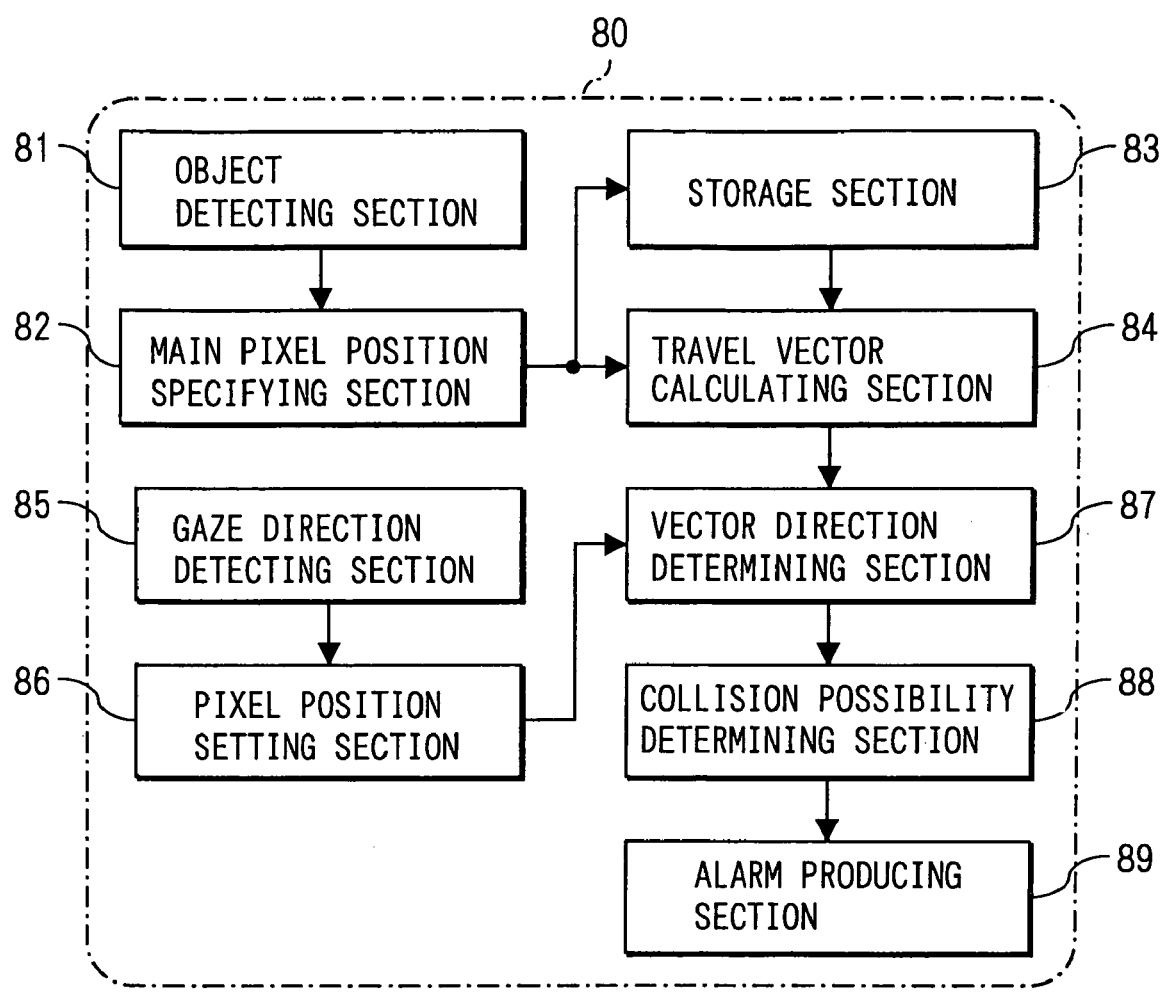
FIG. 2 is a control block diagram of a computer included in the active safety system according to the embodiment.

Referring to FIG. 2, the computer 80 includes an object detecting section 81, a main pixel position specifying section 82, a storage section 83, a travel vector calculating section 84, a gaze direction detecting section 85, a pixel position setting section 86, a vector direction determining section 87, a collision possibility determining section 88, and an alarm producing section 89. Each section performs a specific process of control.

The object detecting section 81 detects an object, such as a vehicle in front or an obstacle, existing in the travel direction of the vehicle from an image captured by the visible imaging camera 62. The object detecting section 81 obtains a pixel value for each pixel of the captured image received from the visible imaging camera 62 and detects an object using image analysis, such as texture analysis.

The main pixel position specifying section 82 specifies a position of a main pixel that represents a position of the object detected by the object detecting section 81. For instance, it calculates a position of pixel at the center of gravity of the object from a position of pixel that is a part of an outline of the object, and specifies the calculated position as a main pixel position.

The storage section 83 stores the main pixel position specified by the main pixel position specifying section 82. It assigns a unique number to each object and stores the main pixel position with the unique number. As a result, a history of main pixel positions of a specific object can be stored. The travel vector calculating section 84 calculates a travel vector based on the main pixel position stored in the storage section 83 and the main pixel position specified by the main pixel position specifying section 82. The travel vector indicates a direction of relative movement of a specific object with respect to the vehicle.

The gaze direction detecting section 85 detects a viewpoint (eye position) of the driver from an image of the driver's face captured by the infrared camera 64. It detects characteristic points in the image, such as inner and outer corners of the driver's eye, and specifies a facing direction of the driver. It estimates a focal point of the driver on a front windshield based on a position of the driver's pupil detected from the image of the driver's face and the facing direction. The computer 80 calculates a focal point of the driver in the image captured by the visible imaging camera 62, the focal point corresponding to the focal point on the front windshield, based on the estimated focal point and the viewpoint.

The pixel position setting section 86 sets a position of pixel included in the focal point in the image and a circle with a specific radius from the set pixel position on the image. The pixel position is referred to as a travel direction pixel position. The driver focuses on an area ahead of the vehicle and the gaze direction of the driver matches the travel direction of the vehicle. Thus, the travel direction pixel position can be set based on the gaze direction of the driver. A driver of a vehicle often looks different directions other than the forward direction in general. Time may be counted while the driver maintains his or her gaze direction for setting a pixel position of the image corresponding to the gaze direction in which the driver maintains his or her gaze for the longest time period as the travel direction pixel position.

The vector direction determining section 87 determines an orientation of a travel vector of the object. It determines whether the orientation of the travel vector matches the direction toward the inside of the circle set by the pixel position setting section 86. Then, it sends a result of the determination to the collision possibility determining section 88.

The collision possibility determining section 88 determines that a possible collision between the object and the vehicle when the orientation of the travel vector matches the direction toward the inside of the circle. Then, it sends an instruction signal for producing a warning to the warning producing section 89. The warning producing section 89 starts producing a warning when received the instruction signal. Thus, the driver is notified of the existence of an object with which the vehicle may collide.

An obstacle or a possible obstacle to the vehicle is an object that exists in the way of the vehicle. Namely, whether an object is possibly an obstacle to the vehicle can be determined based on the travel direction of the vehicle and the moving direction of the object. The computer 80 determines a possibility of collision between the vehicle and the object based on the travel vector of the object and the travel direction pixel position. The travel vector indicates the moving direction of the object. The travel direction pixel position is determined based on the gaze direction of the driver that substantially matches the travel direction of the vehicle. Thus, the computer 80 can properly detect an object that is possible an obstacle to the vehicle.

Figure 3:
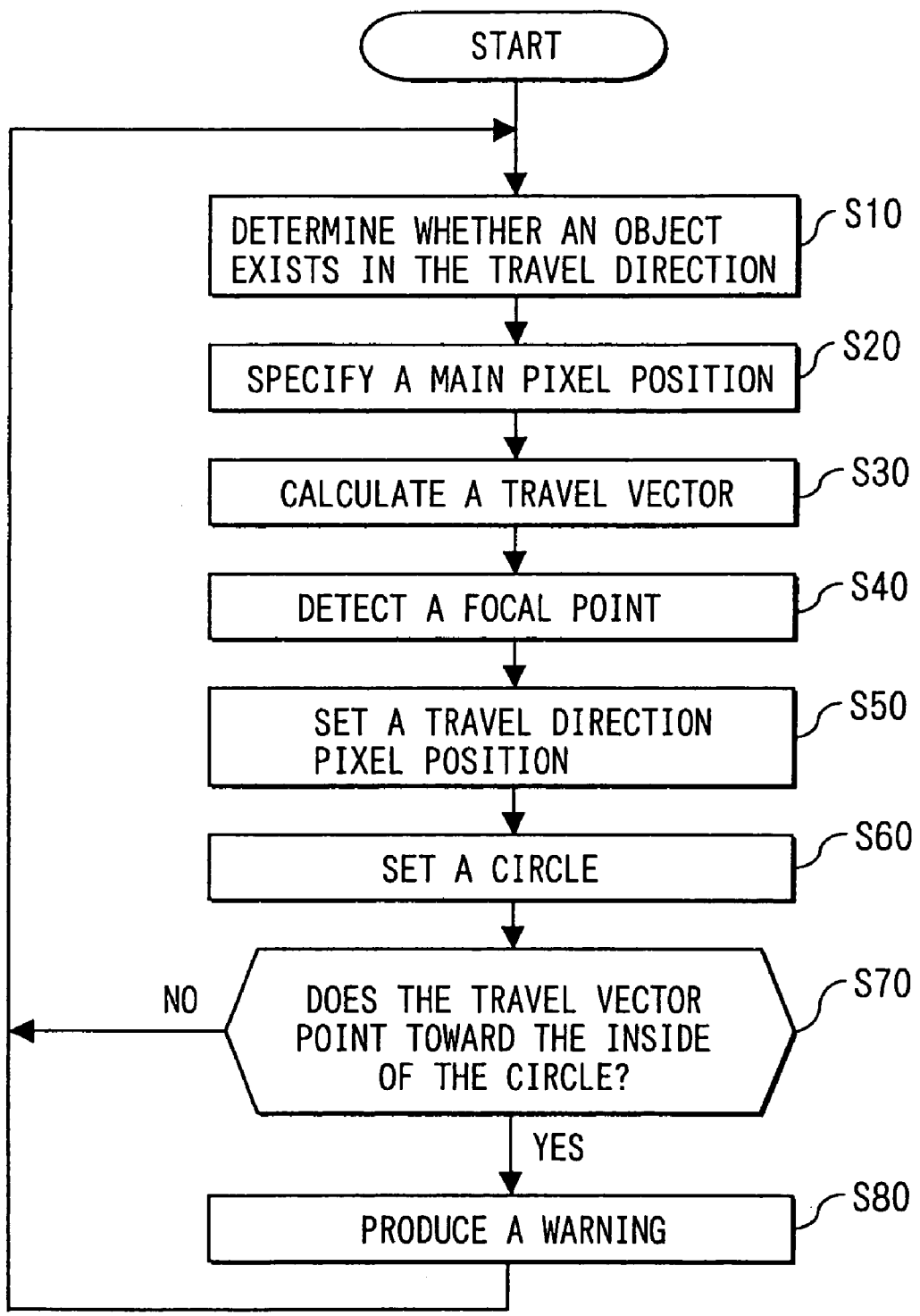
FIG. 3 is a flowchart of a warning producing process performed by the active safety system according to the embodiment.

A warning producing process performed by the active safety system 200 will be discussed referring to FIG. 3. The computer 80 determines whether an object exists in the travel direction of the vehicle from an image captured by the visible imaging camera 62 (S10). If an object is detected, it specifies a main pixel position of the object in the image (S20). It calculates a travel vector indicating the moving direction of the object based on a history of the main pixel position (S30).

The computer 80 detects a focal point that indicates the gaze direction of the driver from an image of the driver's face captured by the infrared camera 62 (S40). It sets a travel direction pixel position corresponding to the detected focal point in the image (S50) and a circle with the set pixel position as a center of the circle (S60).

The computer 80 determines whether the travel vector points toward the inside of the circle (S70). If so, it performs a control for producing a warning to notify the driver of an existence of an object in the travel direction (S80). If not, it repeats steps S10 through S70.

Figure 4:
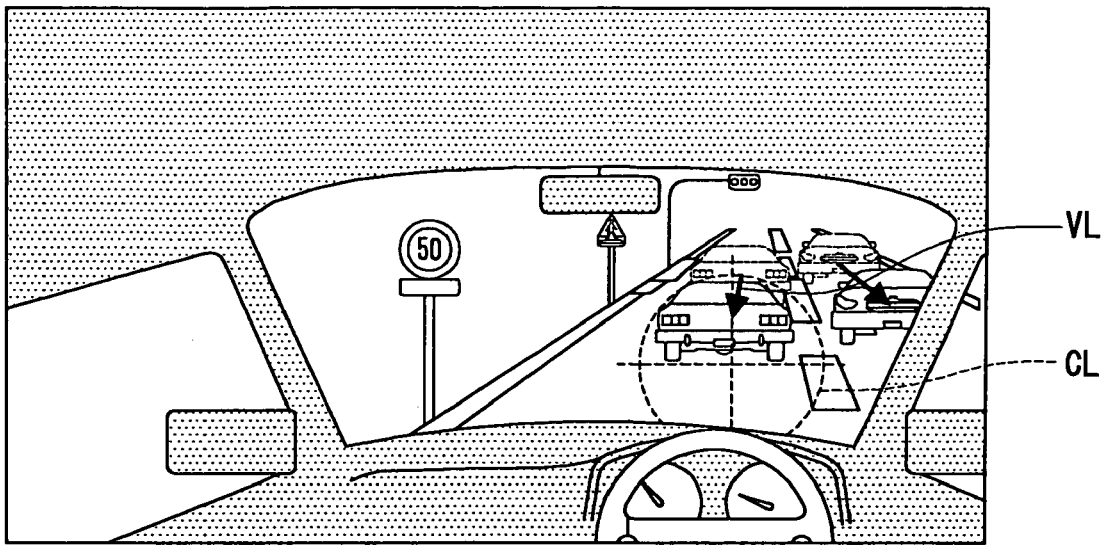
FIG. 4 is an explanatory diagram showing a part of a collision possibility determination process according to the embodiment.

The active safety system 200, for example, determines a possibility of collision between the vehicle and vehicles in front and in an opposing lane. Referring to FIG. 4, it determines the possibility of collision between the vehicle and the vehicle in front when the travel vector VL of the vehicle in front points toward the inside of the circle CL. The active safety system 200 may determine the possibility of collision when the travel vector points to toward the travel direction pixel position.

Figure 5:
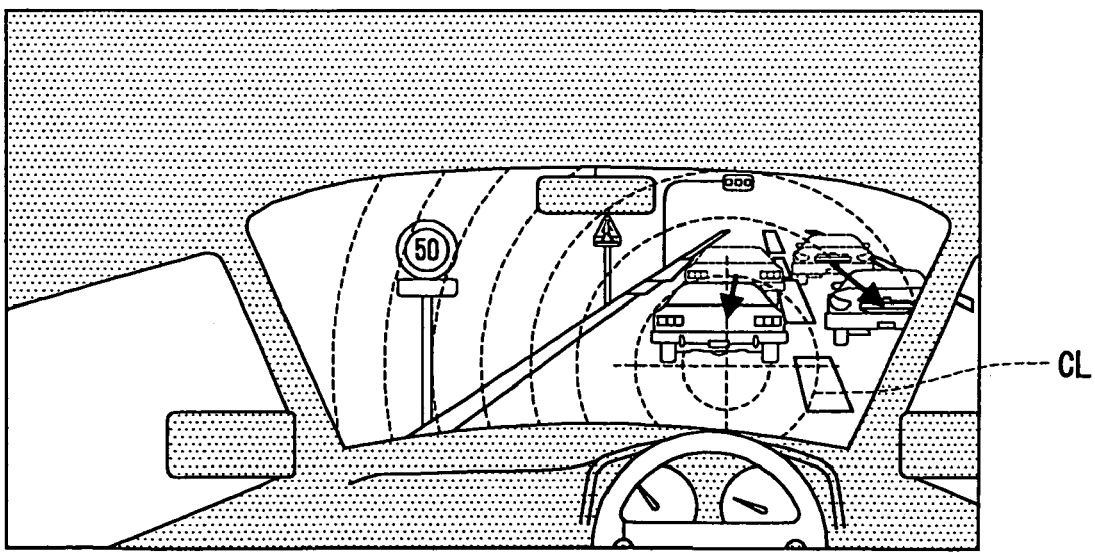
FIG. 5 is an explanatory diagram showing a part of a modified collision possibility determination process according to the embodiment.

The present invention should not be limited to the embodiment previously discussed and shown in the figures, but may be implemented in various ways without departing from the spirit of the invention. For example, a warning level may be set according to a distance between a pixel of the travel vector and the travel direction pixel. A start of producing a warning may be altered according to the warning level. A time margin becomes smaller as the distance between the pixel of the travel vector and the travel direction pixel. If circles CL with different radiuses are set as shown in FIG. 5, warnings can be produced at different levels according to the distance. Thus, the driver is notified of an object that exists in a short distance, that is, notified that the time margin for avoiding a collision with the object is small.

The travel direction pixel may be set at a position on the image corresponding to a predetermined distance ahead of the vehicle. For example, a distance that is long enough for the driver to become aware of conditions in the travel direction after a warning is produced is determined based on experiments and set a position corresponding to the distance.

The travel direction pixel position can be changed according to a speed of the vehicle or a radius of a curve in a road. The distance should be set longer when the vehicle speed is high while it can be set shorter when the vehicle speed is low. The travel direction of the vehicle is determined based on a radius of a curve in a road. Therefore, the travel direction pixel position can be set according to the driving condition by detecting the vehicle speed and the radius and by altering at least one of x and y coordinates of the position based on results of the detection.

A radius of a curve in a road can be estimated from an image of the road captured by the visible imaging camera 62, or from a steering angle or a yaw rate.

What is claimed is:

1. A collision possibility determination device for a vehicle, comprising:
    image capturing means that captures an image of view ahead of the vehicle;
    object detecting means that determines whether an object exists in a travel direction of the vehicle from the image captured by the image capturing means;
    main pixel position specifying means that specifies a main pixel position of an image of the object, the main pixel position representing a position of the object in the image of view;
    pixel position setting means that sets a travel direction pixel position in the image of view based on the travel direction of the vehicle;
    storage means that stores the main pixel position;
    travel vector calculating means that calculates a travel vector of the object from a history of the main pixel position of the object stored by the storage means; and
    collision possibility determining means that determines a possibility of a collision between the vehicle and the object based on an orientation of the travel vector and the travel direction pixel position; wherein
        the pixel position setting means sets a circle with a specific radius from the set travel direction pixel position on the image;
        the vector direction determining means determines whether the orientation of the travel vector matches a direction toward an inside of the circle; and
        the collision possibility determining means determines that a possible collision between the vehicle and the object when the orientation of the travel vector matches the direction toward the inside of the circle.

2. The collision possibility determination device according to claim 1, further comprising warning producing means that produces a warning when a possible collision is determined by the collision possibility determining means.

3. The collision possibility determination device according to claim 2, wherein the warning producing means includes warning level altering means that alters a warning level based on a distance between the main pixel and the travel direction pixel.

4. A collision possibility determination device for a vehicle, comprising:
    image capturing means that captures an image of view ahead of the vehicle;
    object detecting means that determines whether an object exists in a travel direction of the vehicle from the image captured by the image capturing means;
    main pixel position specifying means that specifies a main pixel position of an image of the object, the main pixel position representing a position of the object in the image of view;
    pixel position setting means that sets a travel direction pixel position in the image of view based on the travel direction of the vehicle;
    storage means that stores the main pixel position;
    travel vector calculating means that calculates a travel vector of the object from a history of the main pixel position of the object stored by the storage means;
    collision possibility determining means that determines a possibility of a collision between the vehicle and the object based on an orientation of the travel vector and the travel direction pixel position; and
    gaze direction detecting means that detects a gaze direction of a driver; wherein the pixel position setting means sets a position that corresponds to the gaze direction on the image as a travel direction pixel position.

5. The collision possibility determination device according to claim 4, further comprising:
    warning producing means that produces a warning when a possible collision is determined by the collision possibility determining means.

6. The collision possibility determination device according to claim 5, wherein the warning producing means includes warning level altering means that alters a warning level based on a distance between the main pixel and the travel direction pixel.

7. A collision possibility determination device for a vehicle, comprising:
    image capturing means that captures an image of view ahead of the vehicle;
    object detecting means that determines whether an object exists in a travel direction of the vehicle from the image captured by the image capturing means;
    main pixel position specifying means that specifies a main pixel position of an image of the object, the main pixel position representing a position of the object in the image of view;
    pixel position setting means that sets a travel direction pixel position in the image of view based on the travel direction of the vehicle;
    storage means that stores the main pixel position;
    travel vector calculating means that calculates a travel vector of the object from a history of the main pixel position of the object stored by the storage means; and
    collision possibility determining means that determines a possibility of a collision between the vehicle and the object based on an orientation of the travel vector and the travel direction pixel position; wherein
    the pixel position setting means sets a position that corresponds to an actual position a predetermined distance ahead of the vehicle on the image as a travel direction pixel position.

8. The collision possibility determination device according to claim 7, further comprising condition determining means that determines a driving condition including a vehicle speed and a road condition including a radius of a curve in a road in the travel direction, wherein the pixel position setting means includes setting altering means that alters at least one of x and y coordinates of the travel direction pixel position in the image according to at least one of the driving condition and the road condition.

9. The collision possibility determination device according to claim 7, further comprising:
    warning producing means that produces a warning when a possible collision is determined by the collision possibility determining means.

10. The collision possibility determination device according to claim 9, wherein the warning producing means includes warning level altering means that alters a warning level based on a distance between the main pixel and the travel direction pixel.

* * * * *